United States Patent [19]

Gillery

[11] Patent Number: 4,820,902
[45] Date of Patent: Apr. 11, 1989

[54] BUS BAR ARRANGEMENT FOR AN ELECTRICALLY HEATED TRANSPARENCY

[75] Inventor: F. Howard Gillery, Allison Park, Pa.

[73] Assignee: PPG Industries, Inc., Pittsburgh, Pa.

[21] Appl. No.: 138,008

[22] Filed: Dec. 28, 1987

[51] Int. Cl.$^4$ .......................... H05B 3/26; E06B 7/12; B60J 1/20

[52] U.S. Cl. ........................... 219/203; 52/171; 219/345; 219/522; 219/543; 219/547; 338/309

[58] Field of Search ............... 219/203, 522, 547, 543, 219/345; 338/308, 309; 52/171

[56] References Cited

U.S. PATENT DOCUMENTS

| | | | |
|---|---|---|---|
| 3,379,859 | 4/1968 | Marriott | 219/543 X |
| 3,781,524 | 12/1973 | Levin | 338/309 |
| 3,794,809 | 2/1974 | Beck et al. | 219/203 |
| 3,876,862 | 4/1975 | Newman et al. | 219/543 X |
| 3,892,947 | 7/1975 | Strengholt | 219/203 X |
| 4,100,398 | 7/1978 | Levin | 219/543 X |

Primary Examiner—Anthony Bartis
Attorney, Agent, or Firm—Dennis G. Millman

[57] ABSTRACT

An electrically heated transparency such as may be employed in a vehicle to provide defrosting, deicing, or defogging capability for the vehicle windows includes a transparent, electroconductive, heat-producing coating, e.g., a film including silver, on a major surface of a transparent sheet, e.g., a glass sheet. First and second bus bars contact the coating along first and second opposite edge portions of the transparency. A pair of electroconductive extensions extend from opposite ends of the second bus bar to a location near the first edge portion along third and fourth edge portions of the transparency, with the extensions being electrically insulated from the coating and the first bus bar. Terminal areas of the extensions and the first bus bar are connected to a power source. The extensions reduce the power losses in the bus bars, produce a more uniform heating pattern, and provide redundancy should one of the extensions fail.

11 Claims, 1 Drawing Sheet

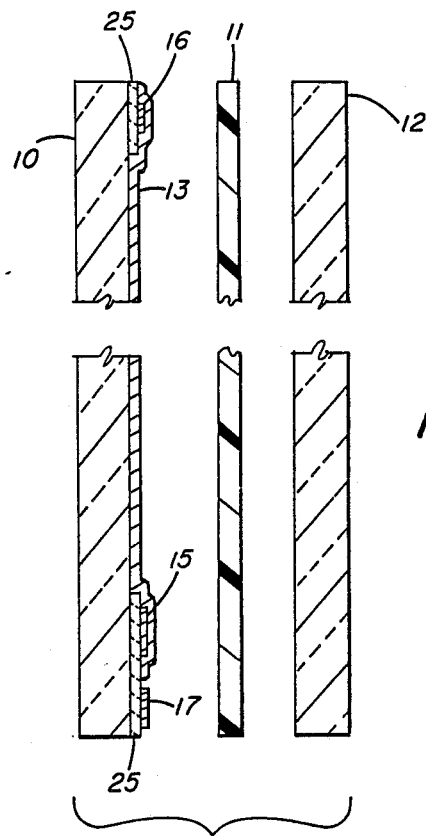
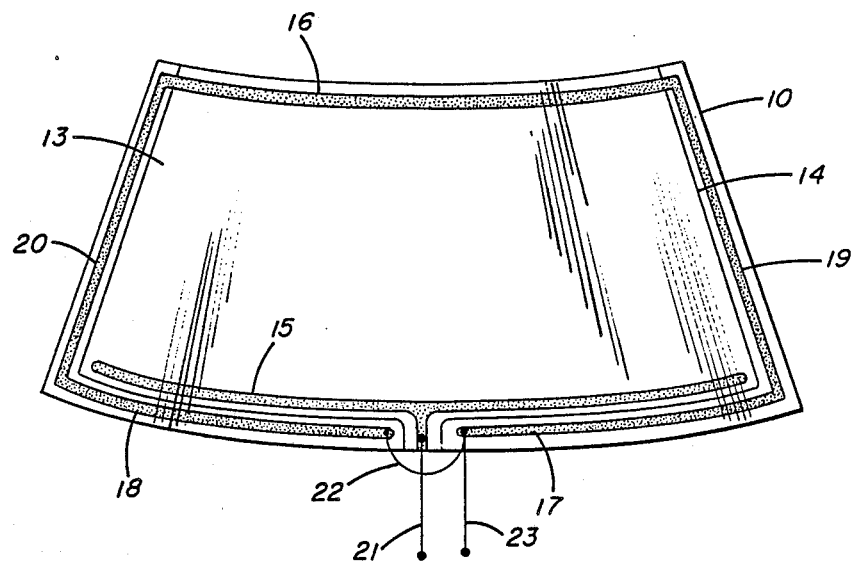

BUS BAR ARRANGEMENT FOR AN ELECTRICALLY HEATED TRANSPARENCY

BACKGROUND OF THE INVENTION

This invention relates to an improvement in an electrically heated transparency such as may be employed in a vehicle to provide defrosting, deicing, or defogging capability. In particular, the improvement is in the bus bar arrangement and is intended to provide more reliable performance of the heating means.

It has been known to pass electric current through a transparent conductive coating on a transparency in order to raise the temperature of the transparency. Generally, a source of electrical potential is connected to the conductive coating by way of a pair of bus bars along opposite sides of the area of the transparency to be heated. The bus bars have low resistivity relative to the coating and are intended to distribute the current evenly over the area to be heated. The bus bars may be comprised of metallic foil strips, but in the case of glass transparencies they preferably are comprised of a metallic-ceramic frit material fused onto a surface of the transparency. A typical arrangement includes bus bars configured as substantially parallel stripes on opposite sides of the heated area, with electrical leads attached to each bus bar and extending away from the opposite edges of the transparency as shown in U.S. Pat. Nos. 4,323,726 (Criss et al.) and 4,668,270 (Ramus). Locating the leads on the same side of the transparency and preferably closely adjacent to each other is advantageous for the sake of easier installation of the transparency in the vehicle and simplifying the connection with the electrical power source. Therefore, U.S. Pat. Nos. 3,895,213 (Levin) and 4,543,466 (Ramus) provide an extension of one of the bus bars around an end of the transparency so that connections to both the bus bars can be made in one relatively compact area.

Several modes of failure of heated transparencies can involve the bus bars. An imperfection in or damage to a bus bar such as a thin area or crack results in a concentrated flow of current through that area which in turn causes overheating. A gap in the circuit can cause arcing. Overheating or arcing can damage the plastic innerlayer in a laminated transparency, or even damage the glass in severe cases. Excessive localized heat in a bus bar can also exacerbate the defect, leading to a breach in the circuit and possible inoperativeness. A complete break in a bus bar would, of course, severely impare or render inoperative the heating circuit. Heated transparencies are even more vulnerable to bus bar problems in those cases such as in the aforesaid U.S. Pat. Nos. 3,895,213 and 4,543,466 where an extension of one of the bus bars extends around a third side of the transparency to provide adjacent terminal locations. Not only is there a greater length of bus bar subject to failure in such a case, but also failure in the extension portion is particularly critical since it carries a heavy power load and its malfunction renders the entire system inoperative.

SUMMARY OF THE INVENTION

The invention relates to heated transparencies in which it is desired to locate the electrical terminals along the same edge of the transparency or closely adjacent to each other. In general, one bus bar is close to the terminal location and the other bus bar is remote from the terminal location. In the present invention, connection of the remote bus bar to the electrical circuit is made by way of two conductive extensions of the bus bar, each extending from opposite ends of the remote bus bar along opposite ends of the transparency. The conductive extensions are insulated from the conductive coating on the transparency, preferably by omitting or deleting the coating in the marginal area near the extensions. By providing a second, redundant connection to the remote bus bar, each conductive extension carries only half of the current. Therefore, as compared to prior art arrangements that use a single connection, only one fourth as much heat per unit area of bus bar is generated due to the resistance of the extensions, and the total power loss is halved. If a thin spot or partial break is present in one of the extensions, undue heating at that spot will not occur because the presence of the other extension prevents the total resistance from increasing detrimentally. If one of the bus bar extensions fails, the availability of the other extension can carry the full load and prevent failure of the heating system.

Another advantage is that the dual connections to the remote bus bar yield a more uniform heating pattern in the transparency. When a single connection is made to one end of a bus bar, the resistance of the bus bar itself biases more current to enter the area of the coating near the connection than the area near the opposite end of the bus bar. The result is a higher power output in the region near the connection and an uneven heating pattern. When two connections are made to a bus bar, however, the effect of concentrating the current and the power near the connections is cut in half because it is distributed over two sites. Thus, there is less of a difference in the heating rates between the corners and the center of the transparency.

The advantages of this invention are particularly significant in a large area, low voltage system where total power is high and current is then necessarily large. Such a condition would be typical in a heated automobile windshield, although the invention is not limited to such.

THE DRAWINGS

FIG. 1 is an exploded, cross-sectional, enlarged view of a typical laminated windshield construction in which the present invention may be incorporated.

FIG. 2 is a schematic, elevational view of a windshield incorporating a preferred embodiment of the bus bar arrangement of the present invention.

DETAILED DESCRIPTION

The description of the preferred embodiment herein is in reference to a laminated transparency comprised of two plies of glass bonded together by an interlayer of plastic since that is the typical windshield construction. But it should be understood that the invention can apply to heated transparencies involving a single ply of glass with a single ply of plastic, all plastic laminations, and other combinations involving numerous plies. The transparency need not be intended for use as an automobile windshield, but may be any window for a vehicle or other enclosure, including aircraft.

In the example shown in FIG. 1, the transparency is comprised of an outboard glass sheet 10, a plastic interlayer 11 which may be polyvinylbutyral as is commonly used for laminated windshields or other suitable interlayer material, and an inboard sheet of glass 12. An electroconductive coating 13 is preferably placed on a surface that is not exposed, most preferably on the inboard side of the outboard glass sheet 10. Various coatings may exhibit the combination of transparency and electroconductivity to serve as the heating element for the transparency, but a preferred coating is that disclosed in U.S. Pat. No. 4,610,771 (Gillery), the disclosure of which is hereby incorporated by reference. That coating comprises a film of silver between films of zinc stannate, each of which may be applied sequentially by magnetron sputtering. The silver acts as the conductive layer and the zinc stannate films serve to mask the reflectance of the silver. The coating exhibits appropriate resistivity for use as a heated windshield when the silver layer has a thickness of about 110 angstroms, for example.

An optional feature shown in FIG. 1 but omitted from FIG. 2 for the sake of clarity is an opaque border 25 which may be ceramic enamel applied to the flat glass surface by silk screening and fired on during the heating of the sheet for bending. The opaque border 25 serves to conceal attachment means and other elements when installed in a vehicle, and may also conceal the bus bars of the heating circuit.

Referring now to FIGS. 1 and 2, the electrical connections to the heated windshield embodiment shown are at the lower edge, at the center portion thereof. It should be understood that the connections could be at any edge and at an off-center location such as a corner region. A bottom bus bar 15 and top bus bar 16 are in contact with the coating 13. Line 14 indicates a edge of the coating 13 spaced from the sides and bottom edges of the transparency, leaving an uncoated margin along three sides thereof. The uncoated marginal areas may be created by masking those areas during the coating process. Optionally the entire sheet could be coated and the coating subsequently deleted from those areas. The uncoated marginal areas permit connections to be made to the upper bus bar 16 without contact with the coating 13. As shown in FIG. 2, the connections to the upper bus bar include two conductive strips 17 and 18 extending in opposite directions along the bottom edge of the transparency from the terminal area, and side strips 19 and 20 extending along opposite side portions which connect strips 17 and 18 to opposite ends of the upper bus bar 16. The bus bars and the conductive strips may be made of the ceramic frit material containing silver well known in the art and which may be silk screened onto the glass surface (or onto the opaque border 25) and fused by heating. The conductivity of the bus bars and the conductive strips is chosen to be considerably greater than that of the coating 13. Electrical lead 21 connects the lower bus bar to one pole of an electrical power source, and strips 17 and 18 leading to the upper bus bar may be wired in common to the opposite pole by means of a jumper wire 22 and lead 23.

This description has been set forth with reference to a particular embodiment for the sake providing the best mode of practicing the invention, but it should be understood that variations and modifications known to those in the art may be resorted to without departing from the scope of the invention as defined by the claims that follow.

I claim:

1. An electrically heated transparency comprising: a transparent sheet, a transparent electroconductive coating on a major surface of the sheet, a first bus bar in contact with the coating along a first edge portion of the sheet, a second bus bar in contact with the coating along a second edge portion of the sheet opposite the first edge portion, an electroconductive extension extending from each end of the second bus bar to the first edge portion along third and fourth edge portions respectively, the extensions being electrically insulated from the coating.

2. The transparency of claim 1 wherein at least one of the extensions further extends along at least a portion of the first edge portion substantially parallel to and electrically insulated from the first bus bar.

3. The transparency of claim 2 wherein the first bus bar and both extensions are provided with terminal portions closely adjacent to each other at the first edge portion for connection to a source of electric current.

4. The transparency of claim 3 wherein both of the extensions further extend along a portion of the first edge portion substantially parallel to and electrically insulated from the first bus bar.

5. The transparency of claim 4 wherein the terminal portions are in a center portion of the first edge portion.

6. The transparency of claim 1 wherein the transparent sheet is glass.

7. The transparency of claim 6 comprising a lamination of at least one glass sheet and at least one plastic sheet.

8. The transparency of claim 7 wherein the coating and the bus bars are between the glass sheet and a plastic sheet.

9. The transparency of claim 8 wherein the transparent sheet is curved.

10. The transparency of claim 1 wherein the transparent sheet is plastic.

11. The transparency of claim 1 wherein the coating includes silver.

* * * * *